(12) United States Patent
Hayama

(10) Patent No.: US 9,407,779 B2
(45) Date of Patent: Aug. 2, 2016

(54) DISPLAY APPARATUS AND IMAGE FORMING APPARATUS

(71) Applicant: KYOCERA Document Solutions Inc., Osaka-shi, Osaka (JP)

(72) Inventor: Satoru Hayama, Osaka (JP)

(73) Assignee: KYOCERA DOCUMENT SOLUTIONS INC. (JP)

( * ) Notice: Subject to any disclaimer, the term of this patent is extended or adjusted under 35 U.S.C. 154(b) by 0 days.

(21) Appl. No.: 14/758,292

(22) PCT Filed: Mar. 14, 2014

(86) PCT No.: PCT/JP2014/001478
§ 371 (c)(1),
(2) Date: Jun. 29, 2015

(87) PCT Pub. No.: WO2014/192204
PCT Pub. Date: Dec. 4, 2014

(65) Prior Publication Data
US 2016/0044188 A1    Feb. 11, 2016

(30) Foreign Application Priority Data

May 28, 2013  (JP) ................................. 2013-111884

(51) Int. Cl.
*H04N 1/40*  (2006.01)
*G09G 5/14*  (2006.01)
(Continued)

(52) U.S. Cl.
CPC ............ *H04N 1/00392* (2013.01); *G06F 3/041* (2013.01); *G06F 3/044* (2013.01); *G06F 3/0416* (2013.01); *G06F 3/0488* (2013.01); *G06F 3/04817* (2013.01); *G06F 3/04842* (2013.01); *G06F 3/04883* (2013.01); *G06F 2203/04101* (2013.01)

(58) Field of Classification Search
USPC ............. 358/1.15; 715/77; 345/156, 634, 173
See application file for complete search history.

(56) References Cited

U.S. PATENT DOCUMENTS 4,739,129 A * 4/1988 Owen .................... H01R 13/70
                                                    200/281
2012/0281018 A1* 11/2012 Yamamoto ............ G06F 1/1626
                                                    345/634

(Continued)

FOREIGN PATENT DOCUMENTS

JP         8-16353        1/1996
JP       2006-235859     9/2006

(Continued)

OTHER PUBLICATIONS

Japanese Office Action Dated Nov. 17, 2015.

(Continued)

*Primary Examiner* — Jerome Grant, II
(74) *Attorney, Agent, or Firm* — Gerald E. Hespos; Michael J. Porco; Matthew T. Hespos

(57) ABSTRACT

A coordinate measuring unit measures an x-coordinate, a y-coordinate and a z-coordinate indicating an object position according to a change in the position of an object located within a predetermined distance from a panel surface. A display control unit causes a display unit to display a first mark image defining a peripheral distance of a positon determined by the x- and y-coordinates together with predetermined images. The display control unit causes the display unit to display the first mark image such that an area defined by the first mark image becomes smaller as the z-coordinate becomes smaller.

16 Claims, 20 Drawing Sheets

(51) Int. Cl.
*H04N 1/00* (2006.01)
*G06F 3/0488* (2013.01)
*G06F 3/041* (2006.01)
*G06F 3/044* (2006.01)
*G06F 3/0481* (2013.01)
*G06F 3/0484* (2013.01)

(56) References Cited

U.S. PATENT DOCUMENTS

| | | | | |
|---|---|---|---|---|
| 2012/0301635 A1* | 11/2012 | Hasegawa | | C08J 7/042 428/1.32 |
| 2013/0181897 A1* | 7/2013 | Izumi | | G06F 3/017 345/156 |
| 2013/0194174 A1* | 8/2013 | Bondan | | G06F 3/005 345/156 |
| 2014/0111430 A1 | 4/2014 | Shima | | |
| 2015/0067568 A1* | 3/2015 | Lee | | G06F 3/0482 715/771 |
| 2015/0169125 A1* | 6/2015 | Ito | | G06F 3/0487 345/173 |
| 2015/0199040 A1* | 7/2015 | Takeda | | G06F 3/041 345/173 |
| 2015/0363035 A1* | 12/2015 | Hinckley | | G06F 3/0383 345/173 |

FOREIGN PATENT DOCUMENTS

| | | |
|---|---|---|
| JP | 2006-236143 | 9/2006 |
| JP | 2013-16060 | 1/2013 |
| WO | 2012169106 | 12/2012 |

OTHER PUBLICATIONS

International Search Report of Apr. 15, 2014.

\* cited by examiner

DISPLAY APPARATUS AND IMAGE FORMING APPARATUS

TECHNICAL FIELD

The present invention relates to a display apparatus having a touch panel function and an image forming apparatus with the same.

BACKGROUND ART

A display apparatus having a touch panel function is an apparatus configured such that a transparent touch panel unit is mounted on a display unit, a screen including predetermined images to be depressed is displayed on the display unit and electronic equipment is operated by pressing the predetermined image via the touch panel unit with an object such as a fingertip or a dedicated pen. Examples of the predetermined images include icons and soft keys. The following description is given, taking icons as an example.

Such a display apparatus is mounted in electronic equipment such as a complex machine, a smartphone, a car navigation system or a game machine. In small-size electronic equipment such as a smartphone, the size of a display unit is small. Thus, the size of icons are small in the case of displaying a number of icons on the display unit, wherefore an icon different from the one desired to be depressed may be depressed (mistouch).

A technology for specifying an icon toward which a finger is approaching and enlarging that icon if a distance between the finger and a display unit becomes not longer than a predetermined distance has been proposed as a technology for preventing mistouch (see, for example, Japanese Examined Patent Publication No. 2006-236143).

Further, a technology for enlarging a button displayed on a screen when a cursor is brought closer to the button has been proposed as another technology for preventing mistouch (see, for example, Japanese Examined Patent Publication No. H08-16353).

SUMMARY OF INVENTION

An object of the present invention is to be able to prevent mistouch in a display apparatus having a touch panel function.

A display apparatus according to the present invention for accomplishing the above object includes a touch panel unit having a panel surface to be touched and configured to detect a touched position of the panel surface, a display unit configured to display a predetermined image to be depressed via the panel surface, a coordinate measuring unit configured to measure a coordinate in a first direction, a coordinate in a second direction and a coordinate in a third direction of the position of a certain object located within a predetermined distance from the panel surface according to a change in the position of the object with directions defining a coordinate plane on the panel surface as the first and second directions and a direction perpendicular to the panel surface as the third direction, and a display control unit configured to execute a display control for causing the display unit to display a first mark image for defining a peripheral range of a position determined by the coordinate in the first direction and the coordinate in the second direction together with the predetermined image and causing the display unit to display the first mark image such that an area defined by the first mark image becomes smaller as the coordinate in the third direction becomes smaller when the coordinate in the first direction, the coordinate in the second direction and the coordinate in the third direction are measured by the coordinate measuring unit.

In the display apparatus according to the present invention, the coordinate in the first direction, the coordinate in the second direction and the coordinate in the third direction indicating the position of the object are measured according to a change in the position of the object (e.g. fingertip) located within the predetermined distance from the panel surface. Then, the first mark image defining the peripheral range of the position determined by the coordinate in the first direction and the coordinate in the second direction is displayed on the display unit together with the predetermined image (e.g. icon) to be depressed. The first mark image is displayed on the display unit such that the area defined by the first mark image becomes smaller as the coordinate in the third direction becomes smaller, i.e. as the object approaches the panel surface.

Thus, according to the display apparatus according to the present invention, mistouch can be prevented by bringing the object closer to the panel surface and touching the panel surface while maintaining a state where the area defined by the first mark image overlaps the predetermined image desired to be depressed.

DESCRIPTION OF EMBODIMENTS

Figure 1:
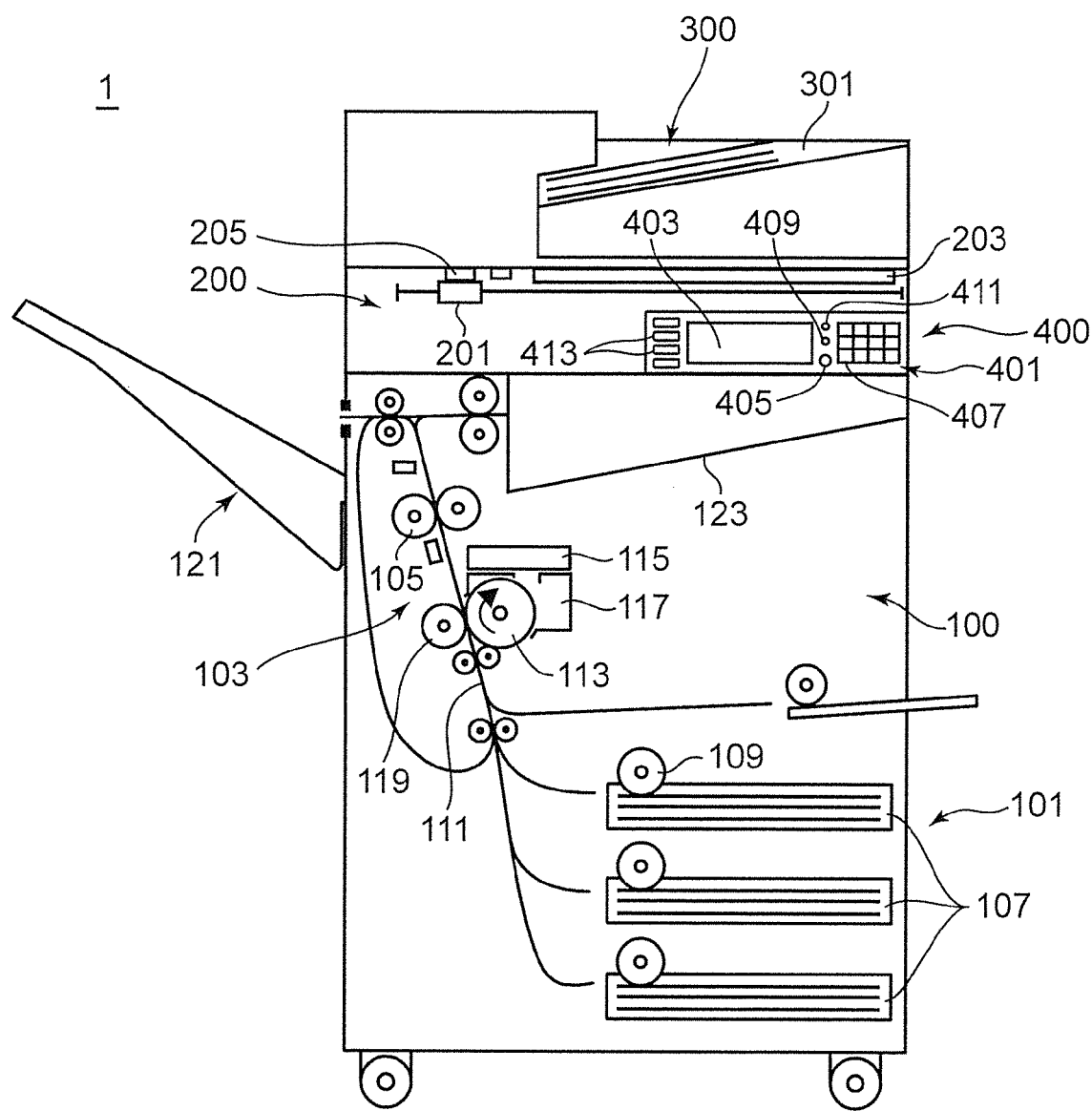
FIG. 1 is a diagram schematically showing the internal structure of an image forming apparatus provided with a display apparatus according to an embodiment.

Hereinafter, embodiments of the present invention are described in detail based on the drawings. FIG. 1 is a diagram schematically showing the internal structure of an image forming apparatus 1 provided with a display apparatus according to an embodiment. The image forming apparatus 1 can be applied, for example, to a digital complex machine having functions of a copier, a printer, a scanner and a facsimile machine. The image forming apparatus 1 includes an apparatus main body 100, a document reading unit 200 arranged on the apparatus main body 100, a document feeding unit 300 arranged on the document reading unit 200 and an operation unit 400 arranged on the front surface of an upper part of the apparatus main body 100.

The document feeding unit 300 functions as an automatic document feeder and can feed a plurality of documents placed on a document placing portion 301 so that the documents can be successively read by the document reading unit 200.

The document reading unit 200 includes a carriage 201 in which an exposure lamp and the like are mounted, a document platen 203 made of a transparent material such as glass, an unillustrated CCD (Charge Coupled Device) sensor and a document reading slit 205. In the case of reading a document placed on the document platen 203, the document is read by the CCD sensor while the carriage 201 is moved in a longitudinal direction of the document platen 203. Contrary to this, in the case of reading a document fed from the document feeding unit 300, the carriage 201 is moved to a position facing the document reading slit 205 and the document fed from the document feeding unit 300 is read by the CCD sensor through the document reading slit 205. The CCD sensor outputs an image of the read document as image data.

The apparatus main body 100 includes a sheet storage unit 101, an image forming unit 103 and a fixing unit 105. The sheet storage unit 101 is arranged in a lowermost part of the apparatus main body 100 and includes a sheet tray 107 capable of storing a stack of sheets. The uppermost sheet in the sheet stack stored in the sheet tray 107 is fed toward a sheet conveyance path 111 by the drive of a pickup roller 109. The sheet is conveyed to the image forming unit 103 through the sheet conveyance path 111.

The image forming unit 103 forms a toner image on a sheet conveyed thereto. The image forming unit 103 includes a photoconductive drum 113, an exposure unit 115, a developing unit 117 and a transfer unit 119. The exposure unit 115 generates light modulated in accordance with image data (image data output from the document reading unit 200, image data transmitted from a personal computer, facsimile-received image data or the like) and irradiates the uniformly charged circumferential surface of the photoconductive drum 113 with the generated light. In this way, an electrostatic latent image corresponding to the image data is formed on the circumferential surface of the photoconductive drum 113. By supplying toner to the circumferential surface of the photoconductive drum 113 from the developing unit 117 in this state, a toner image corresponding to the image data is formed on the circumferential surface. This toner image is transferred to a sheet conveyed from the sheet storage unit 101 described above by the transfer unit 119.

The sheet having the toner image transferred thereto is fed to the fixing unit 105. In the fixing unit 105, heat and pressure are applied to the toner image and the sheet and the toner image is fixed to the sheet. The sheet is discharged to a stack tray 121 or a sheet discharge tray 123.

The operation unit 400 includes an operation key unit 401 and a touch panel type display unit 403. The touch panel type display unit 403 has a touch panel function and a screen including soft keys and the like is displayed thereon. A user performs setting and the like necessary to execute a function such as a copy function by operating the soft keys and the like while viewing the screen.

The operation key unit 401 is provided with operation keys which are hard keys. Specifically, the operation key unit 401 is provided with a start key 405, a numerical keypad 407, a stop key 409, a reset key 411, function changeover keys 413 for changing copy, printer, scanner and facsimile functions from one to another and the like.

The start key 405 is a key for starting an operation such as copying or facsimile transmission. The numerical keypad 407 includes keys for entering numbers such as the number of copies to be made and facsimile numbers. The stop key 409 is a key for stopping a copying operation or the like halfway. The reset key 411 is a key for returning a set content to an initially set state.

The function changeover keys 413 include a copy key, a transmit key and the like and switch the copy function, the transmission function and the like from one to another. If the copy key is operated, an initial screen for copying is displayed on the display unit 403. If the transmit key is operated, an initial screen for facsimile transmission and mail transmission is displayed on the display unit 403.

Figure 2:
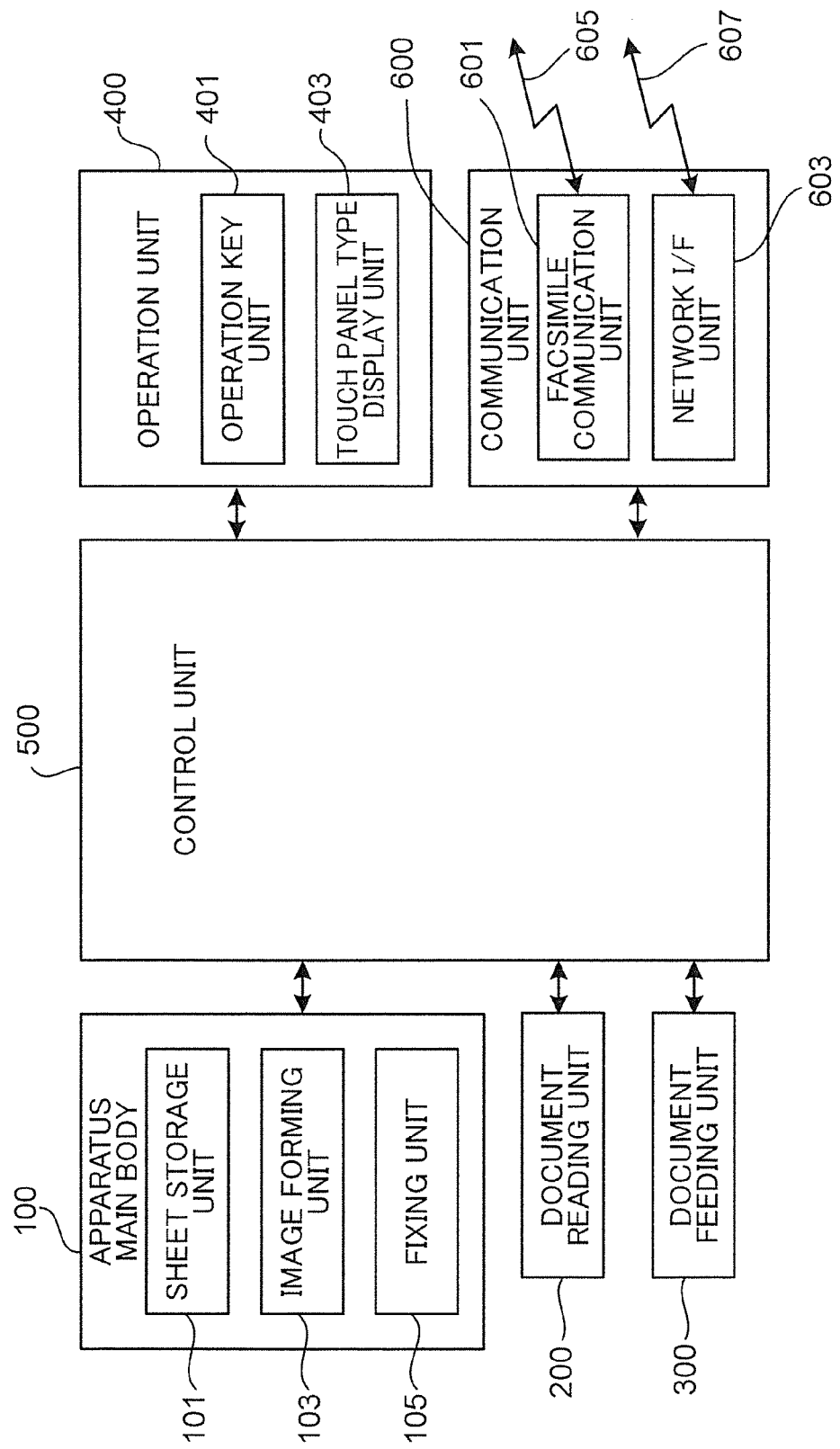
FIG. 2 is a block diagram showing the configuration of the image forming apparatus shown in FIG. 1.

FIG. 2 is a block diagram showing the configuration of the image forming apparatus 1 shown in FIG. 1. The image forming apparatus 1 is so configured that the apparatus main body 100, the document reading unit 200, the document feeding unit 300, the operation unit 400, a control unit 500 and a communication unit 600 are connected to each other by buses. The apparatus main body 100, the document reading unit 200, the document feeding unit 300 and the operation unit 400 are not described since being already described.

The control unit 500 includes a CPU (Central Processing Unit), a ROM (Read Only Memory), a RAM (Random Access Memory), an image memory and the like. The CPU executes a control necessary to operate the image forming apparatus 1 on the above constituent elements of the image forming apparatus 1 such as the apparatus main body 100. The ROM stores software necessary to control the operation of the image forming apparatus 1. The RAM is used to temporarily store data generated during the execution of the software and store application software. The image memory temporarily stores image data (image data output from the document reading unit 200, image data transmitted from a personal computer, facsimile-received image data and the like).

The communication unit 600 includes a facsimile communication unit 601 and a network I/F unit 603. The facsimile communication unit 601 includes an NCU (Network Control Unit) for controlling connection between a destination facsimile machine and a telephone line and a modulation/demodulation circuit for modulating/demodulating a signal for facsimile communication. The facsimile communication unit 601 is connected to a telephone line 605.

The network I/F unit 603 is connected to a LAN (Local Area Network) 607. The network I/F unit 603 is a communication interface circuit for carrying out communication with terminal apparatuses such as personal computers connected to the LAN 607.

Figure 3:
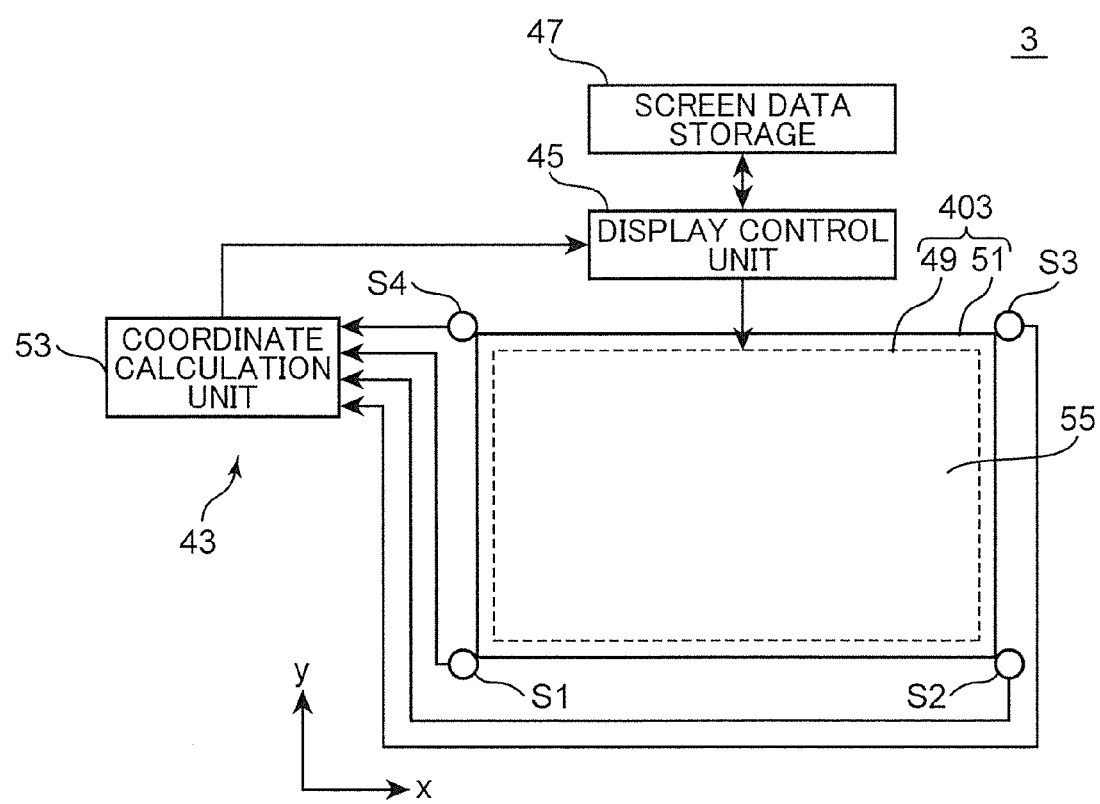
FIG. 3 is a block diagram showing the configuration of a display apparatus according to a first embodiment.
Figure 4:
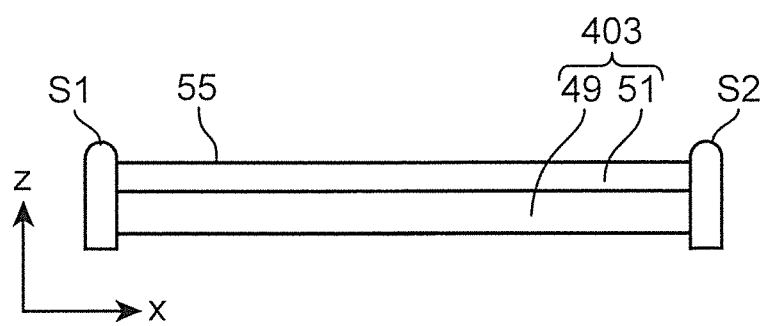
FIG. 4 is a side view of a touch panel type display unit provided in the display apparatus according to the first embodiment.

There are a first embodiment and a second embodiment. The first embodiment is first described. FIG. 3 is a block diagram showing the configuration of a display apparatus 3 according to the first embodiment. The display apparatus 3 includes a touch panel type display unit 403, a coordinate measuring unit 43, a display control unit 45 and a screen data storage 47. The touch panel type display unit 403 is shown in a plan view. FIG. 4 is a side view of the touch panel type display unit 403.

The touch panel type display unit 403 includes a display unit 49 and a touch panel unit 51 arranged on the display unit 49.

The touch panel unit 51 is a device including a panel surface 55 to be touched by an object such as a fingertip and configured to detect a touched position of the panel surface 55. Objects for touching the panel surface 55 include fingertips, dedicated pens and the like. The touch panel unit 51 adopts various methods such as a resistance film method and an electrostatic capacitive method.

The display unit 49 displays a screen including predetermined images. The predetermined images are images to be depressed via the panel surface 55 by an object such as a fingertip. Examples of the predetermined images include icons, soft keys used to enter numbers and the like. The display unit 49 is realized by a liquid crystal display or a plasma display.

The screen data storage 47 stores data representing screens to be displayed on the display unit 49, data representing predetermined images included in the screens and data representing a first mark image included in the screens. The first mark image is described later.

The display control unit 45 reads the above data from the screen data storage 47 and executes a control for causing the display unit 49 to display screens including the predetermined images and screens including the predetermined images and the first mark image.

The coordinate measuring unit 43 includes a coordinate calculation unit 53 and first to fourth distance measuring sensors S1, S2, S3 and S4 arranged on four corners of the touch panel type display unit 403. Directions defining a coordinate plane on the panel surface 55 are referred to as a first direction and a second direction, and a direction perpendicular to the panel surface 55 is referred to as a third direction. In this embodiment, the first direction is described as an x-axis direction, the second direction as a y-axis direction and the third direction as a z-axis direction.

The coordinate measuring unit 43 measures the position of an object such as a fingertip located above the panel surface 55 according to a change in the position of the object if a distance between the object and the panel surface 55 becomes not larger than a predetermined value. The coordinate measuring unit 43 measures the position of the object by measuring x-, y- and z-coordinates indicating the position of the object.

Figure 5A:
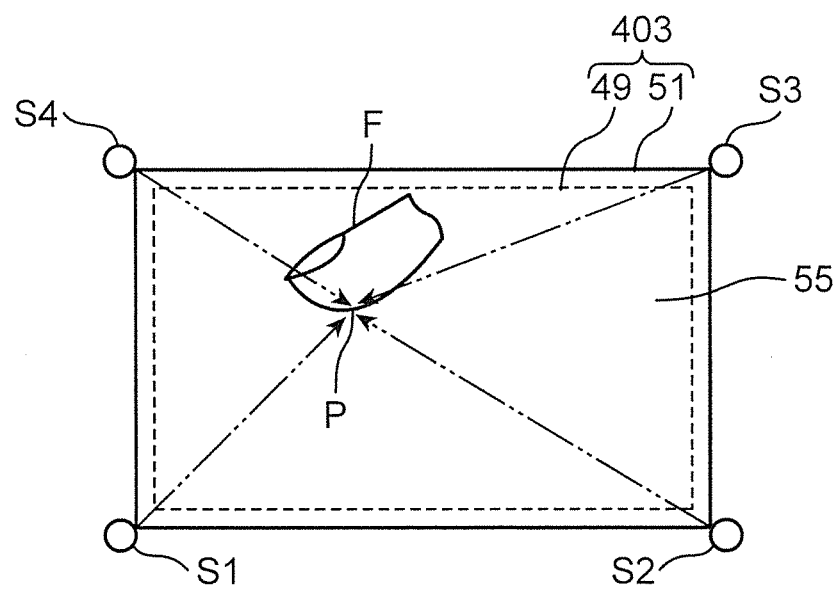
FIG. 5A is a diagram showing a state where an object is viewed from an upper side of touch panel type display unit in the case of measuring a distance to the object located above a panel surface.
Figure 5B:
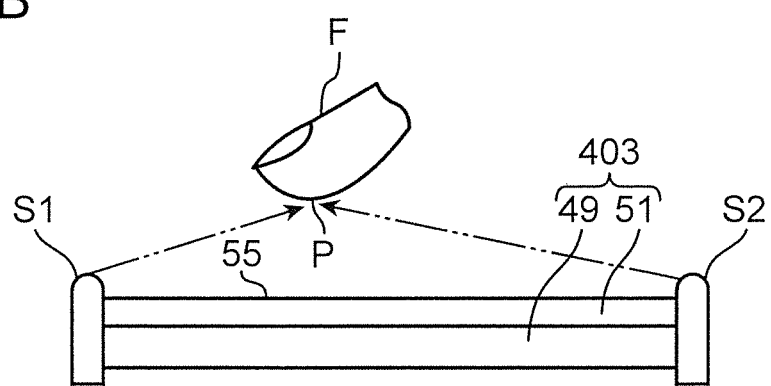
FIG. 5B is a diagram showing a state where the object is viewed from a side surface side of the touch panel type display unit in the case of measuring the distance to the object located above the panel surface.

FIGS. 5A and 5B are diagrams showing a state where a distance to an object F located above the panel surface 55 is measured by each of the first, second, third and fourth distance measuring sensors S1, S2, S3 and S4. FIG. 5A shows a state where the object F is viewed from an upper side of the touch panel type display unit 403 and FIG. 5B shows a state where the object F is viewed from a side surface side of the touch panel type display unit 403. The object F is a fingertip.

A theory of being able to measure an object position P, which is the position of the object F located above the panel surface 55, using the first to fourth distance measuring sensors S1, S2, S3 and S4 is described.

Figure 6:
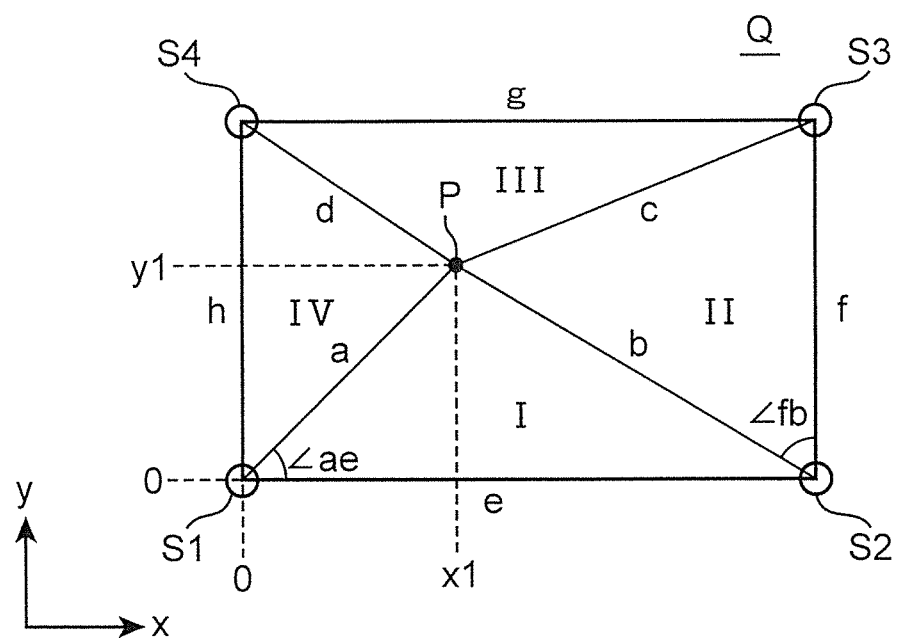
FIG. 6 is a plan view of a four-sided pyramid with vertices located at an object position and the positions of a first distance measuring sensor, a second distance measuring sensor, a third distance measuring sensor and a fourth distance measuring sensor.

FIG. 6 is a plan view of a four-sided pyramid Q with vertices located at the object position P and the positions of the first distance measuring sensor S1, the second distance measuring sensor S2, the third distance measuring sensor S3 and the fourth distance measuring sensor S4. The position of the first distance measuring sensor S1 is assumed to be an origin.

The y-coordinates of the first and second distance measuring sensors S1, S2 are the same value (=0), and the y-coordinates of the third and fourth distance measuring sensors S3, S4 are the same value. The x-coordinates of the first and fourth distance measuring sensors S1, S4 are the same value (=0), and the x-coordinates of the second and third distance measuring sensors S2, S3 are the same value. It is assumed that the x-coordinate of the object position P is x1 and the y-coordinate thereof is y1.

A distance from the position of the first distance measuring sensor S1 to the object position P measured using the first distance measuring sensor S1 is shown as a side a. A distance from the position of the second distance measuring sensor S2 to the object position P measured using the second distance measuring sensor S2 is shown as a side b. A distance from the position of the third distance measuring sensor S3 to the object position P measured using the third distance measuring sensor S3 is shown as a side c. A distance from the position of the fourth distance measuring sensor S4 to the object position P measured using the fourth distance measuring sensor S4 is shown as a side d.

Four triangular side surfaces of the four-sided pyramid Q are referred to as a triangle I, a triangle II, a triangle III and a triangle IV. The triangle I is a triangle with vertices located at the object position P and the positions of the first and second distance measuring sensors S1, S2. Three sides of the triangle I are the sides a, b and a side e connecting the positions of the first and second distance measuring sensors S1, S2. An angle defined by the sides a and e is referred to as an angle ∠ae.

The triangle II is a triangle with vertices located at the object position P and the positions of the second and third distance measuring sensors S2, S3. Three sides of the triangle II are the sides b, c and a side f connecting the positions of the second and third distance measuring sensors S2, S3. An angle defined by the sides b and f is referred to as an angle ∠fb.

The triangle III is a triangle with vertices located at the object position P and the positions of the third and fourth distance measuring sensors S3, S4. Three sides of the triangle III are the sides c, d and a side g connecting the positions of the third and fourth distance measuring sensors S3, S4.

The triangle IV is a triangle with vertices located at the object position P and the positions of the fourth and first distance measuring sensors S4, S1. Three sides of the triangle IV are the sides d, a and a side h connecting the positions of the fourth and first distance measuring sensors S4, S1.

Figure 7:
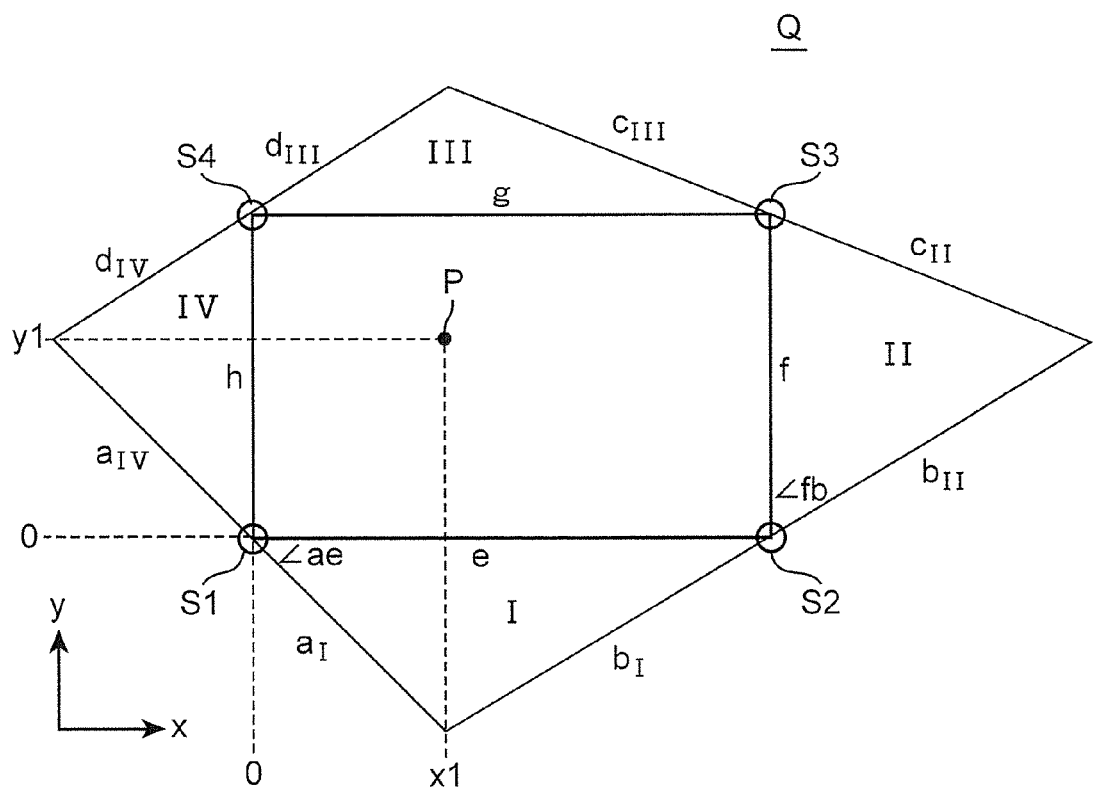
FIG. 7 is a development view of the four-sided pyramid Q shown in FIG. 6.

FIG. 7 is a development view of the four-sided pyramid Q. The sides a, b of the triangle I are shown by sides aI, bI. The sides b, c of the triangle II are shown by sides bII, cII. The sides c, d of the triangle III are shown by sides cIII, dIII. The sides d, a of the triangle IV are shown by sides dIV, aIV.

Figure 8:
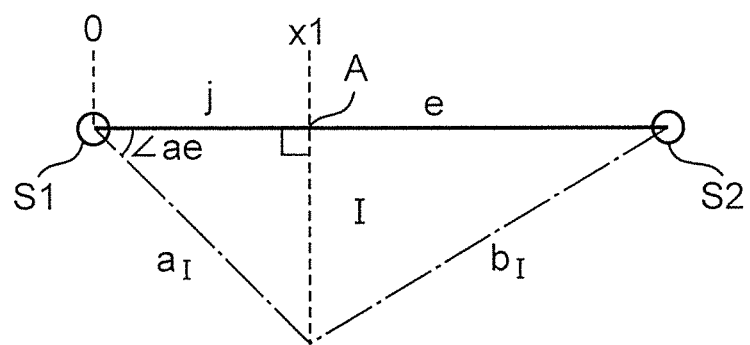
FIG. 8 is a plan view of a triangle I cut out from the development view shown in FIG. 7.

FIG. 8 is a plan view of the triangle I cut out from the development view shown in FIG. 7. A position having an x-coordinate of x1 on the side e is referred to as a position A. A side connecting the position of the first distance measuring sensor S1 and the position A is referred to as a side j.

By the cosine theorem, $\cos \angle ae = (aI^2 + e^2 - bI^2)/(2 \times aI \times e)$. Since $\cos \angle ae = j/aI$, $j = aI \times \cos \angle ae$. The length of the side j, in other words, x1 as the value of the x-coordinate of the object position P, is $aI \times \cos \angle ae$.

Figure 9:
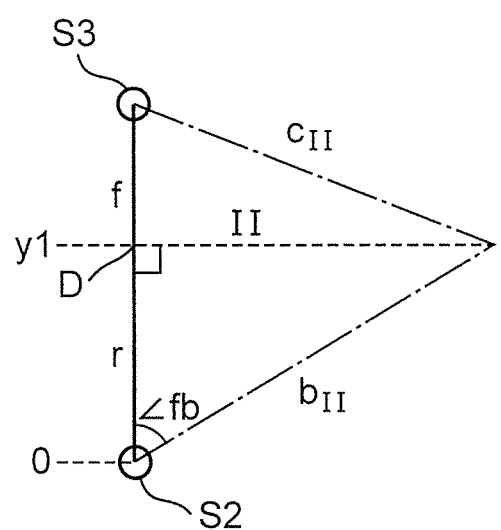
FIG. 9 is a plan view of a triangle II cut out from the development view shown in FIG. 7.

FIG. 9 is a plan view of the triangle II cut out from the development view shown in FIG. 7. A position having a y-coordinate of y1 on the side f is referred to as a position D. A side connecting the position of the second distance measuring sensor S2 and the position D is referred to as a side r.

By the cosine theorem, $\cos \angle fb = (bII^2 + f^2 - cII^2)/(2 \times bII \times f)$. Since $\cos \angle fb = r/bII$, $r = bII \times \cos \angle fb$. The length of the side r, in other words, y1 as the value of the y-coordinate of the object position P, is $bII \times \cos \angle fb$.

The y-coordinate y1 of the object position P is obtained using the triangle II. However, since $\sin \angle ae$ is obtained from a formula of $\sin 2\theta + \cos 2\theta = 1$, the y-coordinate y1 of the object position P can be also obtained using the triangle I shown in FIG. 6. Thus, it is possible to obtain the x- and y-coordinates of the object position P using the triangle I, obtain the x- and y-coordinates of the object position P using the triangle II, obtain the x- and y-coordinates of the object position P using the triangle III, and obtain the x- and y-coordinates of the object position P using the triangle IV.

Figure 10:
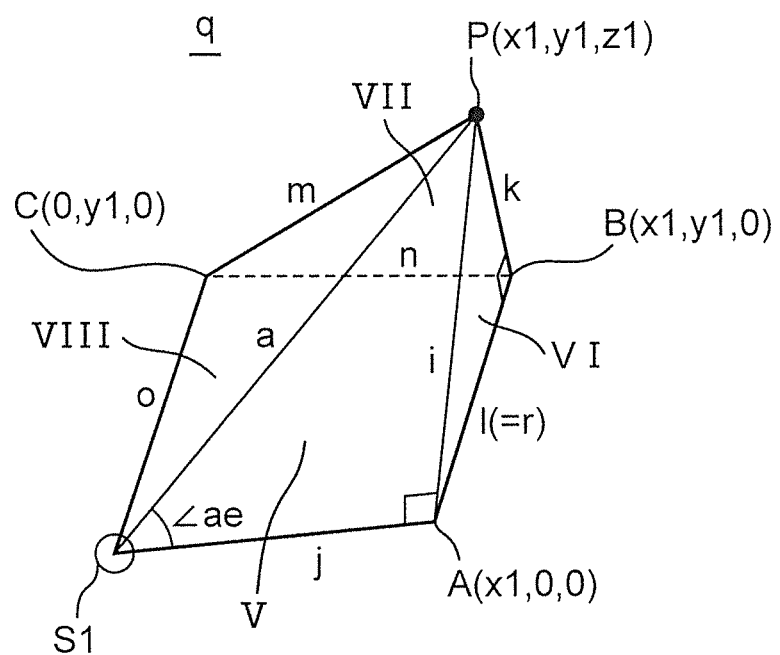
FIG. 10 is a three-dimensional figure of a four-sided pyramid q cut out from the four-sided pyramid Q shown in FIG. 6 by being cut along a direction passing through an object position P and parallel to a y-axis direction and along a direction passing through the object position P and parallel to an x-axis direction.

How to obtain a z-coordinate z1 of the object position P is described. A three-dimensional figure of a four-sided pyramid q cut out by cutting the four-sided pyramid Q shown in FIG. 6 along a direction passing through the object position P and parallel to the y-axis direction and along a direction passing through the object position P and parallel to the x-axis direction is shown in FIG. 10. Coordinates of the object position P are (x1, y1, z1).

Four triangular side surfaces of the four-sided pyramid q are referred to as a triangle V, a triangle VI, a triangle VII and a triangle VIII. The triangle V is a triangle with vertices located at the object position P, the position of the first distance measuring sensor S1 and the position A and a part of the triangle I shown in FIG. 6. Coordinates of the position A are (x1, 0, 0). Three sides of the triangle V are the side a, the side j and a side i connecting the object position P and the position A.

The triangle VI is a triangle with vertices located at the object position P and the positions A and B. Coordinates of the position B are (x1, y1, 0). Three sides of the triangle VI are the side i, a side l and a side k connecting the object position P and the position B.

The triangle VII is a triangle with vertices located at the object position P, the position B and a position C. The position C is located on the side h shown in FIG. 6. Coordinates of the position C are (0, y1, 0). Three sides of the triangle VII are the side k, a side m connecting the object position P and the position C and a side n connecting the positions B and C.

The triangle VIII is a triangle with vertices located at the object position P, the position C and the position of the first distance measuring sensor S1 and a part of the triangle IV shown in FIG. 6. Three sides of the triangle VIII are the side m, the side a and a side o connecting the position C and the position of the first distance measuring sensor S1.

Since $\tan \angle ae = i/j$, $i = j \times \tan \angle ae$. By the Pythagorean theorem ($i^2 = l^2 + k^2$), the length of the side k, i.e. the z-coordinate z1 of the object position P is obtained.

Since the distances to the object F from the first to fourth distance measuring sensors S1, S2, S3 and S4 shown in FIG. 5 are measured using these sensors and the x-, y- and z-coordinates of the object position P can be respectively obtained based on these distances as described above, the object position P can be measured.

Figure 11A:
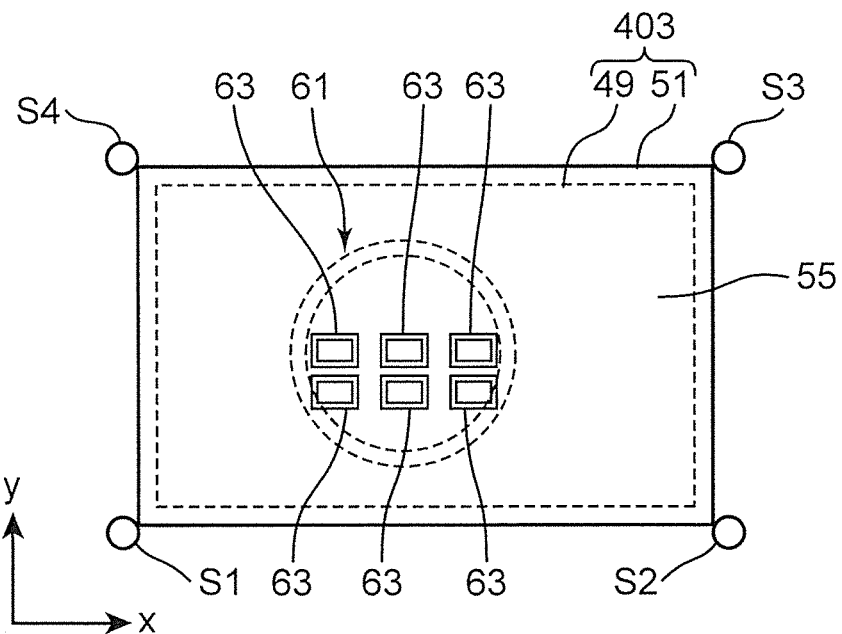
FIG. 11A is a diagram showing a state of the touch panel type display unit viewed from above when a distance between the object and the panel surface is long in the first embodiment.
Figure 11B:
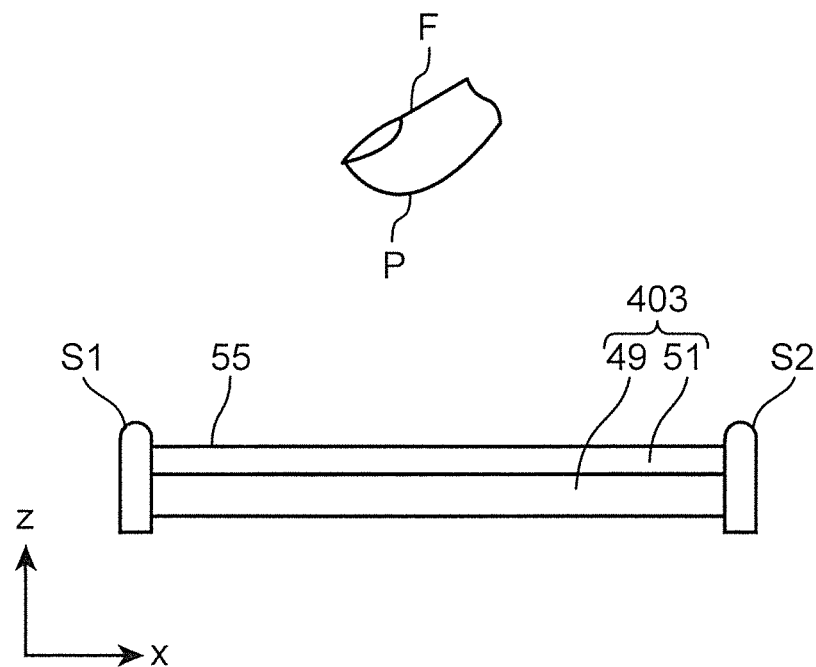
FIG. 11B is a diagram showing a state of the touch panel type display unit viewed laterally when the distance between the object and the panel surface is long in the first embodiment.
Figure 12A:
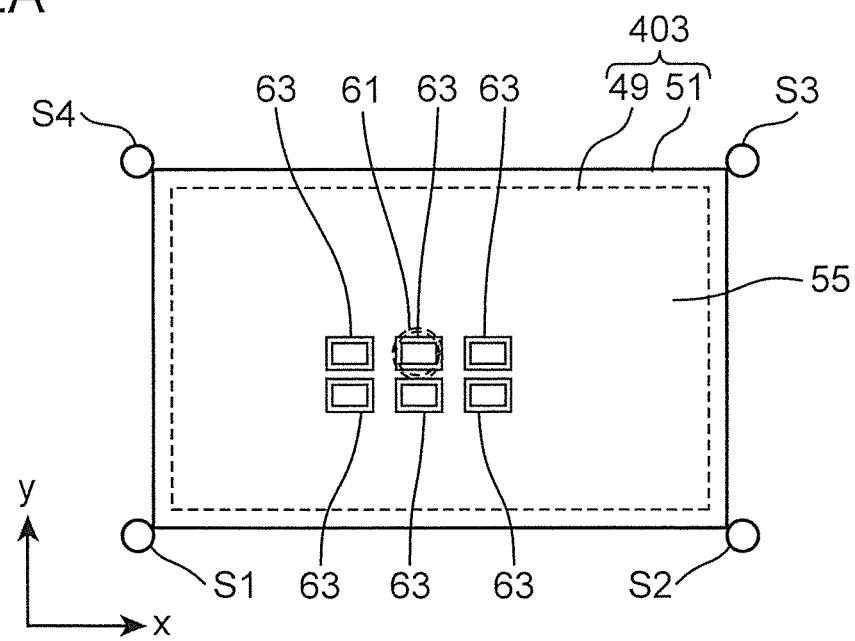
FIG. 12A is a diagram showing a state of the touch panel type display unit viewed from above when the distance between the object and the panel surface is short in the first embodiment.
Figure 12B:
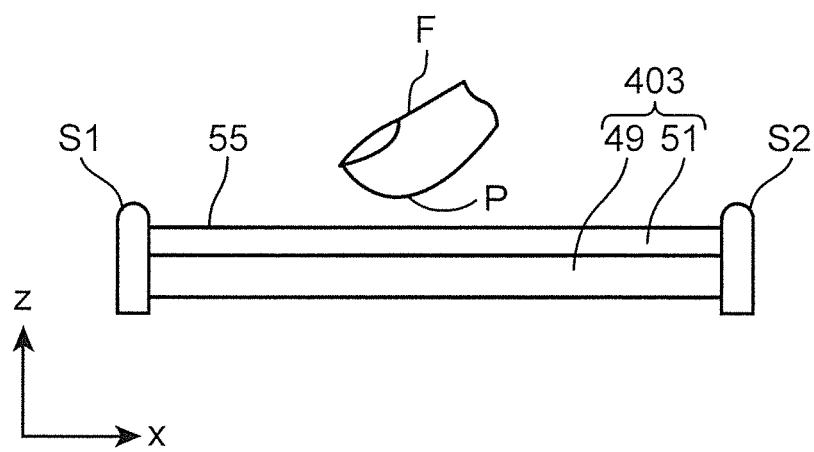
FIG. 12B is a diagram showing a state of the touch panel type display unit viewed laterally when the distance between the object and the panel surface is short in the first embodiment.

Next, the first mark image is described using FIGS. 3, 11A, 11B, 12A and 12B. FIGS. 11A and 11B are diagrams showing a first mark image 61 displayed on the display unit 49 when a distance between the object F and the panel surface 55 is long. FIGS. 12A and 12B are diagrams showing the first mark image 61 displayed on the display unit 49 when the distance between the object F and the panel surface 55 is short. FIGS. 11A and 12A show a state when the touch panel type display unit 403 is viewed from above and FIGS. 11B and 12B show a state when the touch panel type display unit 403 is viewed laterally.

The first mark image 61 and a plurality of predetermined images 63 (e.g. icons) are displayed on the display unit 49. The first mark image 61 is a dotted-line double circle image. The first mark image 61 may be a solid-line image without being limited to the dotted-line image or may be a single circle image without being limited to the double circle image.

In a state where the plurality of predetermined images 63 are displayed on the display unit 49 by the display control unit 45, the coordinate measuring unit 43 measures the x-, y- and z-coordinates indicating the object position P for the object F located above the panel surface 55. When the z-coordinate becomes not longer than a predetermined value, i.e. the distance between the object F and the panel surface 55 becomes not longer than a predetermined distance (e.g. 10 cm), the display control unit 45 causes the display unit 49 to display the first mark image 61 in addition to the plurality of predetermined images 63.

The first mark image 61 defines a peripheral range centered on a position determined by the x- and y-coordinates of the object position P.

As the value of the z-coordinate of the object position P becomes smaller, i.e. as the distance between the object F and the position 55 becomes shorter, the display control unit 45 causes the display unit 49 to display the first mark image 61 such that an area defined by the first mark image 61 becomes gradually (linearly) smaller.

When the value of the z-coordinate of the object position P becomes zero, i.e. the object F touches the panel surface 55, the display control unit 45 causes the display unit 49 to display the first mark image 61 such that the area defined by the first mark image 61 is minimized.

When the object F is brought closer to the panel surface 55 as shown in FIGS. 12A and 12B from a state where the object F is distant from the panel surface 55 as shown in FIGS. 11A and 11B, the display control unit 45 causes the display unit 49 to display the first mark image 61 such that the area defined by the first mark image 61 becomes gradually smaller. Conversely, when the object F is moved away from the panel surface 55 as shown in FIGS. 11A and 11B from the state where the object F is close to the panel surface 55 as shown in FIGS. 12A and 12B, the display control unit 45 causes the display unit 49 to display the first mark image 61 such that the area defined by the first mark image 61 becomes gradually larger.

Figure 13:
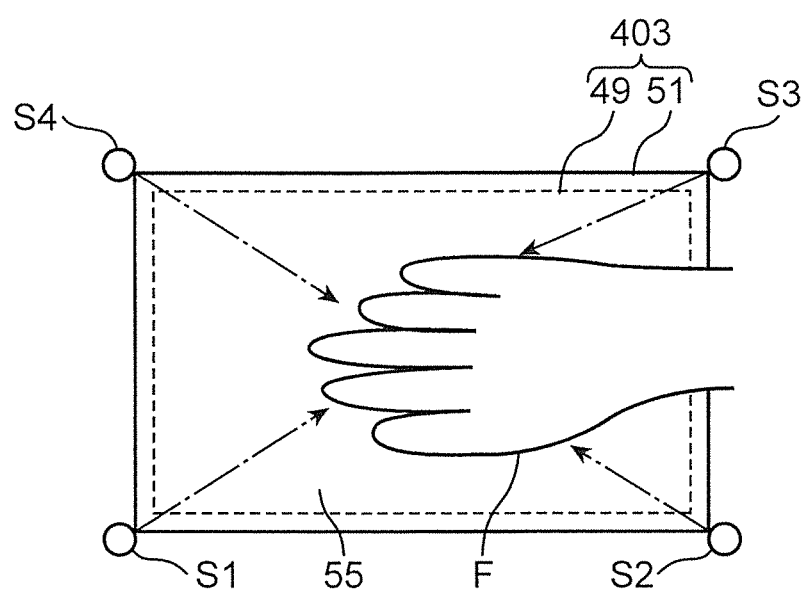
FIG. 13 is a diagram showing a state where a distance to a relatively large object located above the panel surface is measured by each of the first to fourth distance measuring sensors.

The display control unit 45 does not cause the display unit 49 to display the first mark image 61 in the case of a relatively large object F (e.g. palm). This is described. FIG. 13 is a diagram showing a state where a distance to the relatively large object F located above the panel surface 55 is measured by each of the first to fourth distance measuring sensors S1, S2, S3 and S4. The object F here is shown to be a hand.

The first to fourth distance measuring sensors S1, S2, S3 and S4 measure a shortest distance to the object F. The position of the object F measured using the first distance measuring sensor S1 is referred to as an object position P1, the position of the object F measured using the second distance measuring sensor S2 is referred to as an object position P2, the position of the object F measured using the third distance measuring sensor S3 is referred to as an object position P3 and the position of the object F measured using the fourth distance measuring sensor S4 is referred to as an object position P4.

Figure 14:
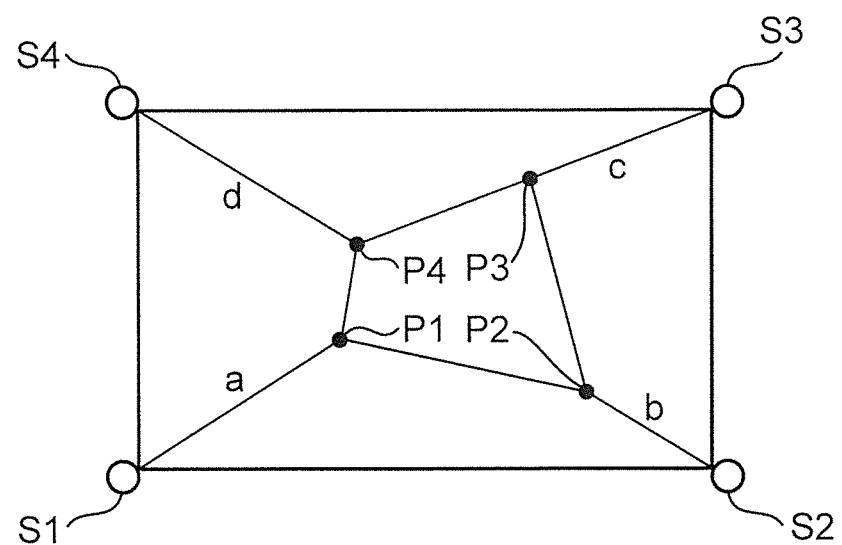
FIG. 14 is a plan view of a solid defined by the positions of the first to four distance measuring sensors and object positions P1, P2, P3 and P4.

FIG. 14 is a plan view of a solid defined by the positions of the first to fourth distance measuring sensors S1, S2, S3 and S4 and the object positions P1, P2, P3 and P4. In the case of the relatively large object F, the object position is not fixed at one point. Thus, the distance between the object F and the panel surface 55 is not fixed as one distance, wherefore the display control unit 45 does not cause the display unit 49 to display the first mark image 61.

Whether or not to display the first mark image 61 can be determined as follows based on the size of the object F. As described above, it is possible to obtain the x- and y-coordinates x1, y1 of the object position P using the triangle I shown in FIG. 6, obtain the x- and y-coordinates x1, y1 of the object position P using the triangle II, obtain the x- and y-coordinates x1, y1 of the object position P using the triangle III, and obtain the x- and y-coordinates x1, y1 of the object position P using the triangle IV.

Equations for obtaining the x-coordinate x1 and the y-coordinate y1 of the object position P using the triangle I are stored in the coordinate calculation unit 53 shown in FIG. 3 in advance. The coordinate calculation unit 53 calculates the x-coordinate x1 and the y-coordinate y1 of the object position P using those equations, the distance to the object F measured by the first distance measuring sensor S1 (=side a) and the distance to the object F measured by the second distance measuring sensor S2 (=side b).

Equations for obtaining the x-coordinate x1 and the y-coordinate y1 of the object position P using the triangle II are stored in the coordinate calculation unit 53 in advance. The coordinate calculation unit 53 calculates the x-coordinate x1 and the y-coordinate y1 of the object position P using those equations, the distance to the object F measured by the second distance measuring sensor S2 (=side b) and the distance to the object F measured by the third distance measuring sensor S3 (=side c).

Equations for obtaining the x-coordinate x1 and the y-coordinate y1 of the object position P using the triangle III are stored in the coordinate calculation unit 53 in advance. The coordinate calculation unit 53 calculates the x-coordinate x1 and the y-coordinate y1 of the object position P using those equations, the distance to the object F measured by the third distance measuring sensor S3 (=side c) and the distance to the object F measured by the fourth distance measuring sensor S4 (=side d).

Equations for obtaining the x-coordinate x1 and the y-coordinate y1 of the object position P using the triangle IV are stored in the coordinate calculation unit 53 in advance. The coordinate calculation unit 53 calculates the x-coordinate x1 and the y-coordinate y1 of the object position P using those equations, the distance to the object F measured by the fourth distance measuring sensor S4 (=side d) and the distance to the object F measured by the first distance measuring sensor S1 (=side a).

As described above, the coordinate calculation unit 53 computes the x-coordinate x1 and the y-coordinate y1 of the object position P using the respective distances measured by the first to fourth distance measuring sensors S1, S2, S3 and S4 as the sides a, b, c and d and using the respective four triangles I, II, III and IV having the object position P as a vertex.

The object position P is fixed at one point in the case of satisfying a condition that all the x-coordinates x1 computed by using each of the four triangles I, II, III and IV coincide and all the y-coordinates y1 computed by using each of the four triangles I, II, III and IV coincide (coincidence condition).

An equation for obtaining the z-coordinate z1 of the object position P is stored in the coordinate calculation unit 53 in advance. When determining that the coincidence condition is satisfied, the coordinate calculation unit 53 computes the z-coordinate z1 using the equation for obtaining the z-coordinate z1 of the object position P. The coordinate calculation unit 53 sends data on the x-, y- and z-coordinates x1, y1 and z1 of the object position P to the display control unit 45. The display control unit 45 causes the display unit 49 to display the first mark image 61 based on that data.

When determining that the coincidence condition is not satisfied, the coordinate calculation unit 53 does not compute the z-coordinate z1 of the object position P. Since the data on the x-, y- and z-coordinates x1, y1 and z1 of the object position P is not sent to the display control unit 45, the display control unit 45 does not cause the display unit 49 to display the first mark image 61.

The four distance measuring sensors S1, S2, S3 and S4 are used to determine whether or not to display the first mark image 61 based on the size of the object F. However, it is sufficient to provide at least three distance measuring sensors. This is described, taking the use of the first to third distance measuring sensors S1, S2 and S3 as an example. With reference to FIG. 6, the coordinate calculation unit 53 computes the x- and y-coordinates of the object position P as described above using the distance measured by the first distance measuring sensor S1 (=side a) and the distance measured by the second distance measuring sensor S2 (=side b).

Similarly, the coordinate calculation unit 53 computes the x- and y-coordinates of the object position P as described above using the distance measured by the second distance measuring sensor S2 (=side b) and the distance measured by the third distance measuring sensor S3 (=side c). In this way, two combinations of the x- and y-coordinates are determined.

The coordinate calculation unit 53 computes the z-coordinate if all the x-coordinates coincide and all the y-coordinates coincide in the two combinations and does not compute the z-coordinate if the coincidence condition is not satisfied.

Figure 15:
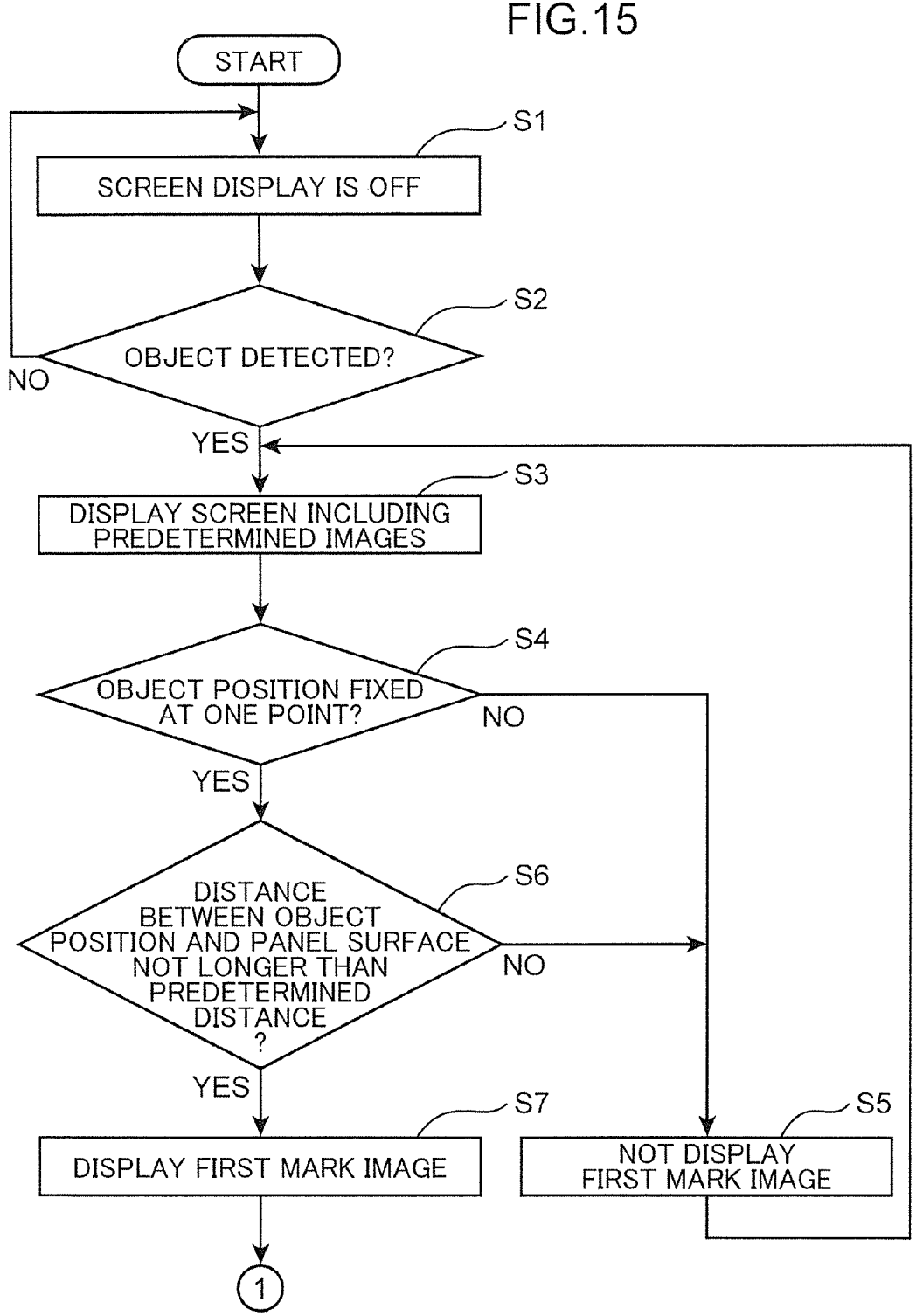
FIG. 15 is a flow chart (first half) showing the operation of the display apparatus according to the first embodiment.
Figure 16:
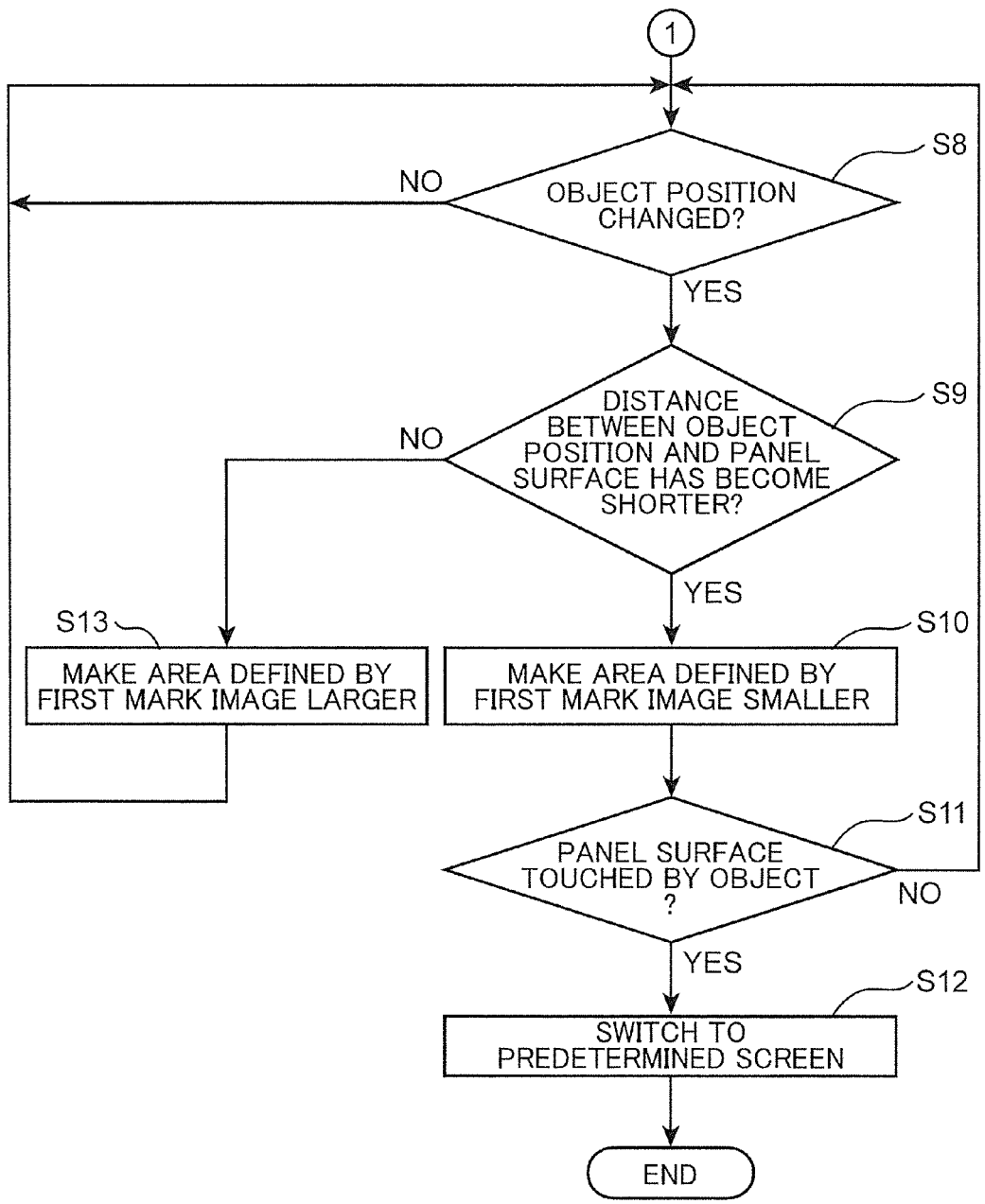
FIG. 16 is a flow chart (second half) showing the operation of the display apparatus according to the first embodiment.

The operation of the display apparatus 3 according to the first embodiment is described using FIGS. 3, 11A, 11B, 12A, 12B, 15 and 16. FIGS. 15 and 16 are flow charts showing that operation. Description is started from a state where the display of the screen is off on the display unit 49. The predetermined images 63 are described, taking icons as an example. The display control unit 45 executes a control to turn off the display of the screen on the display unit 49 if a condition predetermined for energy saving is satisfied (Step S1).

If the object F is detected by none of the first to fourth distance measuring sensors S1, S2, S3 and S4 (No in Step S2), a return is made to Step S1.

If the object F is detected by at least one of the first to fourth distance measuring sensors S1, S2, S3 and S4 (Yes in Step S2), the display control unit 45 causes the display unit 49 to display a screen including the plurality of predetermined images 63 shown in FIG. 11A (Step S3). At this point of time, the first mark image 61 is not displayed yet.

In a state where the plurality of predetermined images 63 are displayed on the display unit 49 by the display control unit 45, the coordinate measuring unit 43 determines whether or not the object position P is fixed at one point (Step S4). Unless the object position P is fixed at one point (No in Step S4), the display control unit 45 does not cause the display unit 49 to display the first mark image 61 (Step S5). Then, a return is made to Step S3.

When determining that the object position P is fixed at one point (Yes in Step S4), the coordinate measuring unit 43 determines whether or not the distance between the object position P and the panel surface 55 is not longer than a predetermined distance (e.g. 10 cm) (Step S6).

Unless the distance between the object position P and the panel surface 55 is determined to be not longer than the predetermined distance (No in Step S6), the display control unit 45 does not cause the display unit 49 to display the first mark image 61 (Step S5).

If the distance between the object position P and the panel surface 55 is determined to be not longer than the predetermined distance (Yes in Step S6), the display control unit 45 causes the display unit 49 to display the first mark image 61 together with the plurality of predetermined images 63 as shown in FIG. 11A (Step S7).

The coordinate measuring unit 43 determines whether or not the object position P has changed (Step S8). Unless the object position P has changed (No in Step S8), Step S8 is repeated.

If the object position P has changed (Yes in Step S8), the coordinate measuring unit 43 determines whether or not the distance between the object position P and the panel surface 55 has become shorter (Step S9).

If the distance between the object position P and the panel surface 55 is determined to have become shorter (Yes in Step S9), the display control unit 45 causes the display unit 49 to display the first mark image 61 such that the area defined by the first mark image 61 becomes smaller (Step S10).

If the touch panel unit 51 does not detect the touch of the panel surface 55 by the object F (No in Step S11), a return is made to Step S8.

If the touch panel unit 51 detects the touch of the panel surface 55 by the object F (Yes in Step S11), the display control unit 45 switches the screen of the display unit 49 to a predetermined screen (Step S12). Specifically, by the touch of the panel surface 55, the screen for executing the function of the predetermined image 63 (icon) depressed via the panel surface 55 is displayed on the display unit 49. That is, the display control unit 45 causes the display unit 49 to display a first screen including the plurality of predetermined images 63 in a display control. When the touch panel unit 51 detects the touch of the panel surface 55 above any one of the plurality of predetermined images 63 by the object F, the display control unit 45 switches the screen displayed on the display unit 49 from the first screen to a second screen assigned to the predetermined image 63 below the panel surface 55 touched by the object F.

When the coordinate measuring unit 43 determines that the distance between the object position P and the panel surface 55 has become longer (No in Step S9), the display control unit 45 causes the display unit 49 to display the first mark image 61 such that the area defined by the first mark image 61 becomes larger (Step S13). Then, a return is made to Step S8.

Main effects of the first embodiment are described. In the display apparatus 3 according to the first embodiment, the x-, y- and z-coordinates indicating the object position P are measured according to a change in the position of the object F (e.g. fingertip) located within the predetermined distance from the panel surface 55 as shown in FIGS. 5A and 5B. Then, as shown in FIGS. 11A and 11B, the first mark image 61 defining the peripheral range of the position determined by the x- and y-coordinates is displayed on the display unit 49 together with the predetermined images 63 to be depressed. As the z-coordinate becomes smaller, i.e. as the object F approaches the panel surface 55, the first mark image 61 is displayed on the display unit 49 such that the area defined by the first mark image 61 becomes smaller as shown in FIGS. 12A and 12B.

Thus, according to the display apparatus 3 according to the first embodiment, mistouch can be prevented by bringing the object F closer to the panel surface 55 and touching the panel surface 55 while maintaining a state where the area defined by the first mark image 61 overlaps the predetermined image 63 desired to be depressed.

Further, as shown in FIGS. 11A and 11B, the touch panel type display unit 403 is so structured that the transparent touch panel unit 51 for detecting the touched position of the panel surface 55 is placed on the display unit 49. Since the touch panel unit 51 is present between the display unit 49 and the object F such as a fingertip, the distance between the object F such as a fingertip and the predetermined image 63 differs from that between the object F such as a fingertip and the panel surface 55. Since the panel surface 55 of the touch panel unit 51 is touched in the touch panel type display unit 403 while the predetermined images 63 are viewed, it is somewhat difficult to comprehend when the object F such as a fingertip touches the panel surface 55.

According to the display apparatus 3 according to the first embodiment, the first mark image 61 is displayed on the display unit 49 such that the area defined by the first mark image 61 becomes smaller as the object F such as a fingertip approaches the panel surface 55 as described above. Thus, a sense of distance between the object F such as a fingertip and the panel surface 55 can be visually recognized by viewing the first mark image 61.

The first embodiment further has the following effect. The display control unit 45 causes the display unit 49 to display the screen including the predetermined images 63 when the object F is detected by the first to fourth distance measuring sensors S1, S2, S3 and S4 in the state where the display of the screen including the predetermined images 63 is off on the display unit 49 (Steps S1, S2 and S3).

As just described, in the first embodiment, the first to fourth distance measuring sensors S1, S2, S3 and S4 are used as switches for a return from the state where the display of the screen is off to a state where the screen is displayed on the display unit 49. Thus, according to the first embodiment, a return can be made from the state where the display of the screen is off to the state where the screen is displayed on the display unit 49 without newly providing a proximity sensor.

Figure 17:
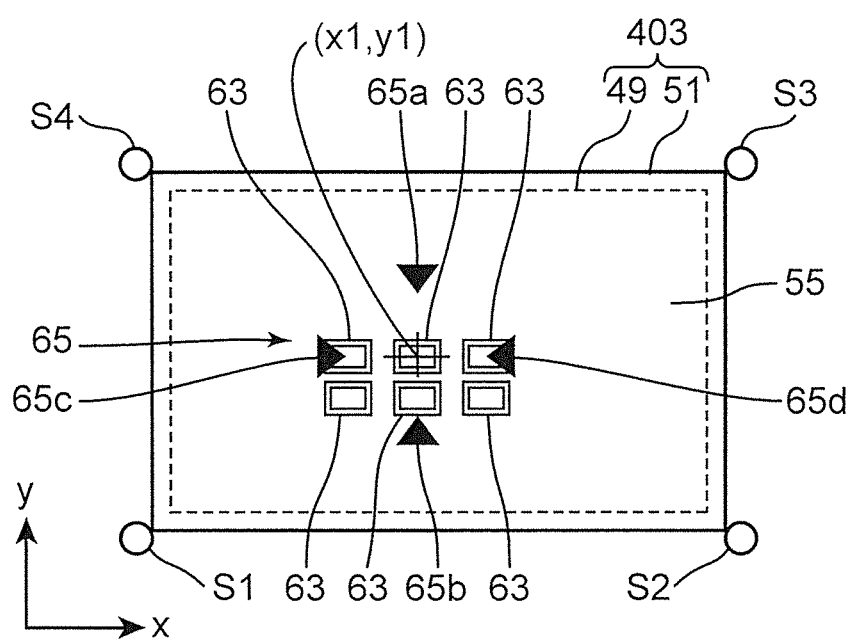
FIG. 17 is a plan view of the touch panel type display unit showing a state where a first mark image as another example is displayed on the display unit when the distance between the object and the panel surface is long.
Figure 18:
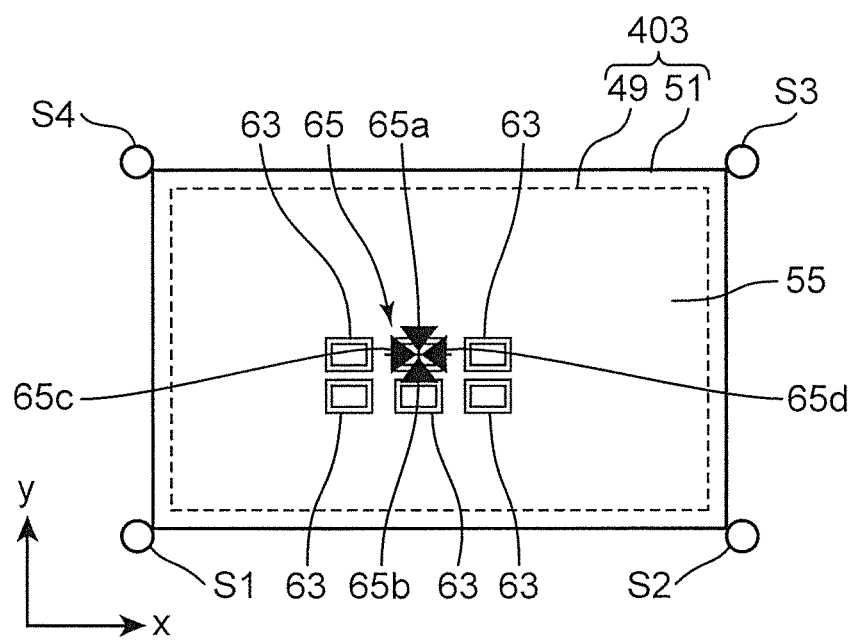
FIG. 18 is a plan view of the touch panel type display unit showing a state where the first mark image as the other example is displayed on the display unit when the distance between the object and the panel surface is short.

The first mark image 61 is not limited to the double circle image and may be any image capable of defining the peripheral range of the position determined by the x- and y-coordinates of the object position P. Another example of the first mark image 61 may be four triangular images located on four sides of the position determined by the x- and y-coordinates. FIG. 17 is a plan view of the touch panel type display unit 403 showing a state where a first mark image 65 as another example is displayed on the display unit 49 when the distance between the object F and the panel surface 55 is long. FIG. 18 is a plan view of the touch panel type display unit 403 showing a state where the first mark image 65 as the other example is displayed on the display unit 49 when the distance between the object F and the panel surface 55 is short.

The first mark image 65 is composed of four triangular images 65a, 65b, 65c and 65d. The triangular images 65a, 65b are arranged along the y-axis direction. The triangular images 65c, 65d are arranged along the x-axis direction. An intersection of a line connecting a vertex of the triangular image 65a and that of the triangular image 65b and a line connecting a vertex of the triangular image 65c and that of the triangular image 65d indicates the x- and y- coordinates x1, y1 of the object position P.

Next, a display apparatus 3 according to the second embodiment is described, centering on points of difference from the display apparatus 3 according to the first embodiment. In the second embodiment, a second mark image is displayed on a display unit 49 in addition to a first mark image 61.

Figure 19A:
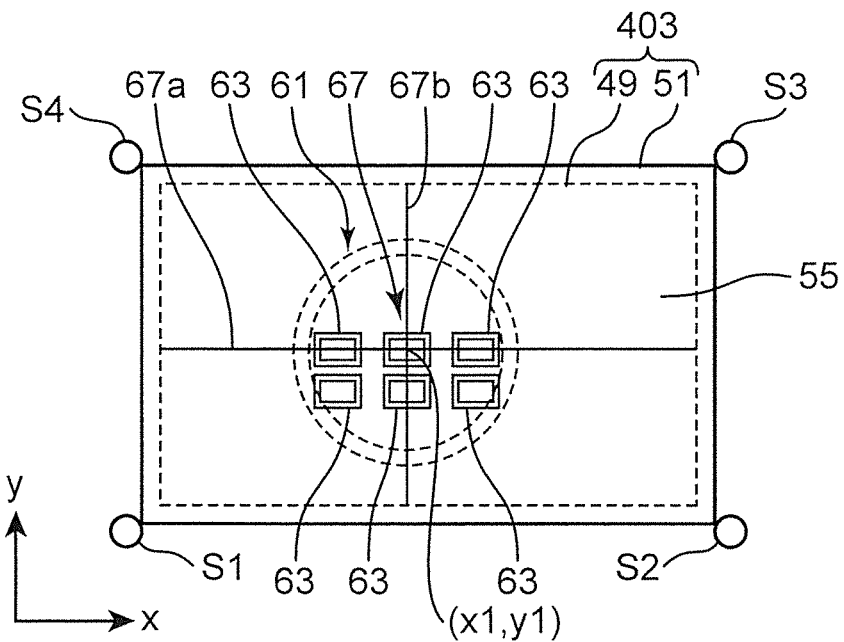
FIG. 19A is a diagram showing a state of a touch panel type display unit viewed from above when a distance between an object and a panel surface is long in a second embodiment.
Figure 19B:
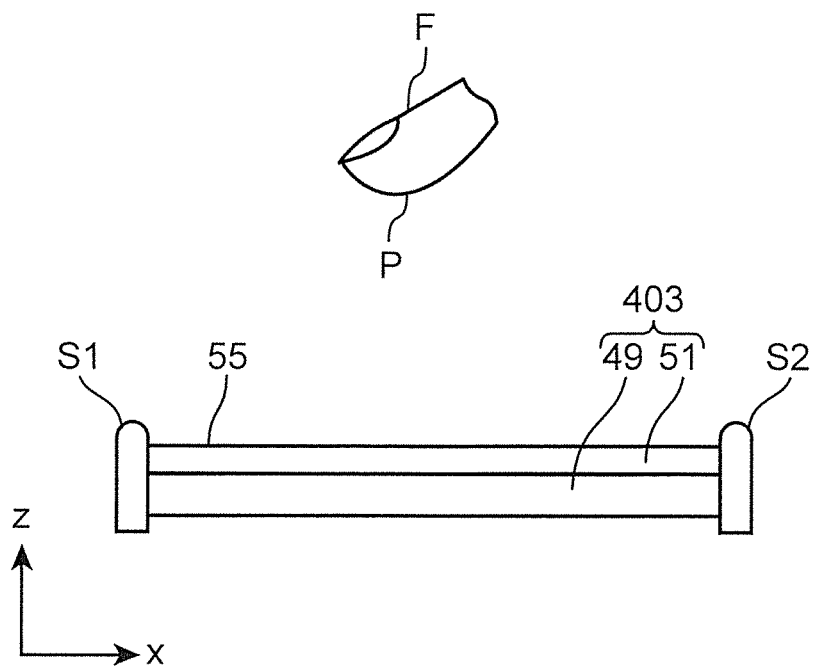
FIG. 19B is a diagram showing a state of the touch panel type display unit viewed laterally when the distance between the object and the panel surface is long in the second embodiment.
Figure 20A:
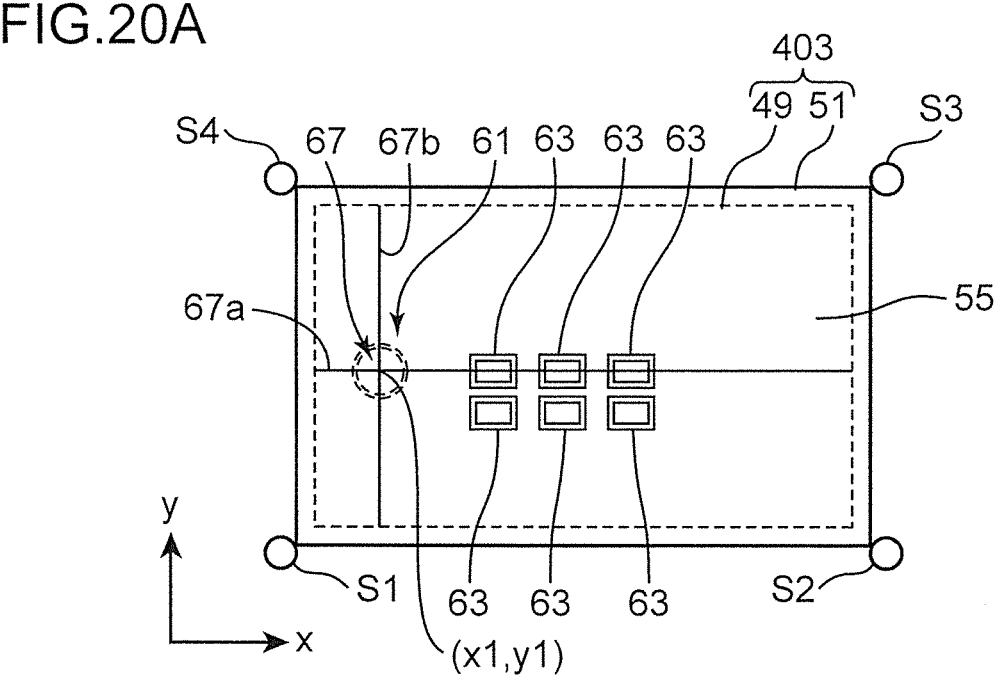
FIG. 20A is a diagram showing a state of the touch panel type display unit viewed from above when the distance between the object and the panel surface is short in the second embodiment.
Figure 20B:
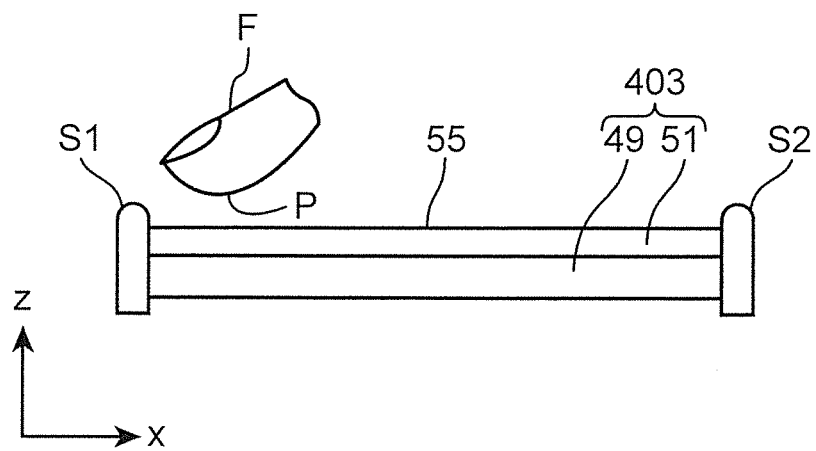
FIG. 20B is a diagram showing a state of the touch panel type display unit viewed laterally when the distance between the object and the panel surface is short in the second embodiment.

FIGS. 19A and 19B are diagrams showing the first and second mark images 61, 67 displayed on the display unit 49 when a distance between an object F and a panel surface 55 is long. FIGS. 20A and 20B are diagrams showing the first and second mark images 61, 67 displayed on the display unit 49 when the distance between the object F and the panel surface 55 is short. FIGS. 19A and 20A show a state of a touch panel type display unit 403 viewed from above and FIGS. 19B and 20B show a state of the touch panel type display unit 403 viewed laterally.

A screen including the first and second mark images 61, 67 and a plurality of predetermined images 63 is displayed on the display unit 49. This screen is displayed on the display unit 49 by the display control unit 45 shown in FIG. 3. The first mark image 61 and the plurality of predetermined images 63 are the same as the first mark image 61 and the plurality of predetermined images 63 shown in FIGS. 11A and 12A.

The second mark image 67 is an image indicating a position determined by an x-coordinate x1 and a y-coordinate y1 of an object position P. The second mark image 67 is composed of a line image 67a indicating the x-axis (one line image extending in a first direction) and a line image 67b indicating the y-axis (one line image extending in a second direction).

Data of the second mark image 67 is stored in the screen data storage 47 shown in FIG. 3 in advance. The display control unit 45 causes the display unit 49 to display the second mark image 67 together with the first mark image 61 when the first mark image 61 is displayed on the display unit 49.

The display apparatus 3 according to the second embodiment has the following effect in addition to the effects of the display apparatus 3 according to the first embodiment. Since the area defined by the first mark image 61 is larger when the distance between the object F such as a fingertip and the panel surface 55 is long than when that distance is short, it is difficult to comprehend above which position of the panel surface 55 the object F is located. According to the second embodiment, since the second mark image 67 indicating the position determined by the x- and y-coordinates is displayed together with the first mark image 61 and the predetermined images 63, above which position of the panel surface 55 the object F is located can be comprehended even if the distance between the object F and the panel surface 55 is long.

Note that a point image indicating the position determined by the x- and y-coordinates is another example of the second mark image.

The invention claimed is:

1. A display apparatus, comprising:
a touch panel unit having a panel surface to be touched and configured to detect a touched position of the panel surface;
a display unit configured to display a predetermined image to be depressed via the panel surface;
a coordinate measuring unit configured to measure a coordinate in a first direction, a coordinate in a second direction and a coordinate in a third direction of the position of a certain object located within a predetermined distance from the panel surface according to a change in the position of the object with directions defining a coordinate plane on the panel surface as the first and second directions and a direction perpendicular to the panel surface as the third direction, the coordinate measuring unit including three or more distance measuring sensors arranged at a distance from each other and each configured to measure a distance to the object and a coordinate calculation unit configured to compute a plurality of combinations of the coordinate in the first direction and the coordinate in the second direction using the distances measured by the plurality of distance measuring sensors, the coordinate measuring unit computing the coordinate in the third direction in the case of satisfying a condition that all the coordinates in the first direction coincide and all the coordinates in the second direction coincide in the plurality of combinations and not computing the coordinate in the third direction in the case of not satisfying the condition; and
a display control unit configured to execute a display control for causing the display unit to display a first mark image for defining a peripheral range of a position determined by the coordinate in the first direction and the coordinate in the second direction together with the predetermined image and causing the display unit to display the first mark image such that an area defined by the first mark image becomes smaller as the coordinate in the third direction becomes smaller when the coordinate in the first direction, the coordinate in the second direction and the coordinate in the third direction are measured by the coordinate measuring unit, wherein the display control unit causes the display unit to display the first mark image when the coordinate in the third direction is computed and does not cause the display unit to display the first mark image when the coordinate in the third direction is not computed in the display control.

2. A display apparatus according to claim 1, wherein the display control unit causes the display unit to display a second mark image indicating the position determined by the coordinate in the first direction and the coordinate in the second direction together with the first mark image and the predetermined image in the display control.

3. A display apparatus according to claim 2, wherein the second mark image includes one line image extending in the first direction and one line image extending in the second direction.

4. A display apparatus according to claim 1, wherein the display control unit causes the display unit to display a screen including the predetermined image when the object is detected by at least one of the plurality of distance measuring sensors in a state where the display of the screen is off on the display unit.

5. A display apparatus according to claim 1, wherein:
the display control unit causes the display unit to display a first screen including the predetermined images in the display control; and
the display control unit switches the screen displayed on the display unit from the first screen to a second screen assigned to the predetermined image in the display control when the touch panel unit detects the touch of the panel surface above the predetermined image by the object.

6. A display apparatus according to claim 1, wherein the display control unit causes the display unit to display the first mark image such that the area defined by the first mark image becomes larger as the coordinate in the third direction becomes larger in the display control.

7. A display apparatus according to claim 1, wherein the display control unit causes the display unit to display a plurality of predetermined images in the display control.

8. A display apparatus according to claim 1, wherein the display control unit causes the display unit to display the first mark image in addition to the predetermined image if the coordinate in the third direction becomes not larger than a predetermined value in a state where the predetermined image is displayed on the display unit in the display control.

9. A display apparatus according to claim 1, wherein the display control unit causes the display unit to display the first mark image such that the area defined by the first mark image becomes gradually smaller as the coordinate in the third direction becomes smaller in the display control.

10. A display apparatus according to claim 1, wherein the display control unit causes the display unit to display an icon as the predetermined image in the display control.

11. A display apparatus according to claim 1, wherein the display control unit causes the display unit to display a soft key as the predetermined image in the display control.

12. A display apparatus according to claim 1, wherein the display control unit causes the display unit to display a circle image as the first mark image in the display control.

13. A display apparatus according to claim 1, wherein the display control unit causes the display unit to display four triangular images located on four sides of the position determined by the coordinate in the first direction and the coordinate in the second direction as the first mark image in the display control.

14. An image forming apparatus, comprising an operation unit including a display apparatus according to claim 1.

15. A display apparatus, comprising:
a touch panel unit having a panel surface to be touched and configured to detect a touched position of the panel surface;
a display unit configured to display a predetermined image to be depressed via the panel surface;
a coordinate measuring unit configured to measure a coordinate in a first direction, a coordinate in a second direction and a coordinate in a third direction of the position of a certain object located within a predetermined distance from the panel surface according to a change in the position of the object with directions defining a coordinate plane on the panel surface as the first and second directions and a direction perpendicular to the panel surface as the third direction, the coordinate measuring unit including three or more distance measuring sensors arranged at a distance from each other and each configured to measure a distance to the object and a coordinate calculation unit configured to compute a plurality of combinations of the coordinate in the first direction and the coordinate in the second direction using the distances measured by the plurality of distance measuring sensors, the coordinate measuring unit computes the coordinate in the third direction in the case of satisfying a condition that all the coordinates in the first direction coincide and all the coordinates in the second direction coincide in the plurality of combinations and does not compute the coordinate in the third direction in the case of not satisfying the condition;
a display control unit configured to execute a display control for causing the display unit to display a first mark image for defining a peripheral range of a position determined by the coordinate in the first direction and the coordinate in the second direction together with the predetermined image and causing the display unit to display the first mark image such that an area defined by the first mark image becomes smaller as the coordinate in the third direction becomes smaller when the coordinate in the first direction, the coordinate in the second direction and the coordinate in the third direction are measured by the coordinate measuring unit, wherein the display control unit:
causes the display unit to display a first screen including a second mark image indicating the position determined by the coordinate in the first direction and the coordinate in the second direction, the first mark image and a plurality of the predetermined images in the display control,
switches the screen displayed on the display unit from the first screen to a second screen assigned to the predetermined image below the panel surface touched by the object in the display control when the touch panel unit detects the touch of the panel surface above any one of the plurality of predetermined images by the object;
causes the display unit to display the first mark image such that the area defined by the first mark image becomes larger as the coordinate in the third direction becomes larger in the display control, and
causes the display unit to display the first mark image when the coordinate in the third direction is computed and does not cause the display unit to display the first mark image when the coordinate in the third direction is not computed in the display control.

16. A display apparatus according to claim 15, wherein the display control unit causes the display unit to display a screen including the plurality of predetermined images when the object is detected by at least one of the plurality of distance measuring sensors in a state where the display of the screen is off on the display unit.

* * * * *